Dec. 8, 1931.   A. L. GOODKNIGHT   1,835,999
AIR BRAKE MECHANISM
Filed March 15, 1929   10 Sheets-Sheet 2
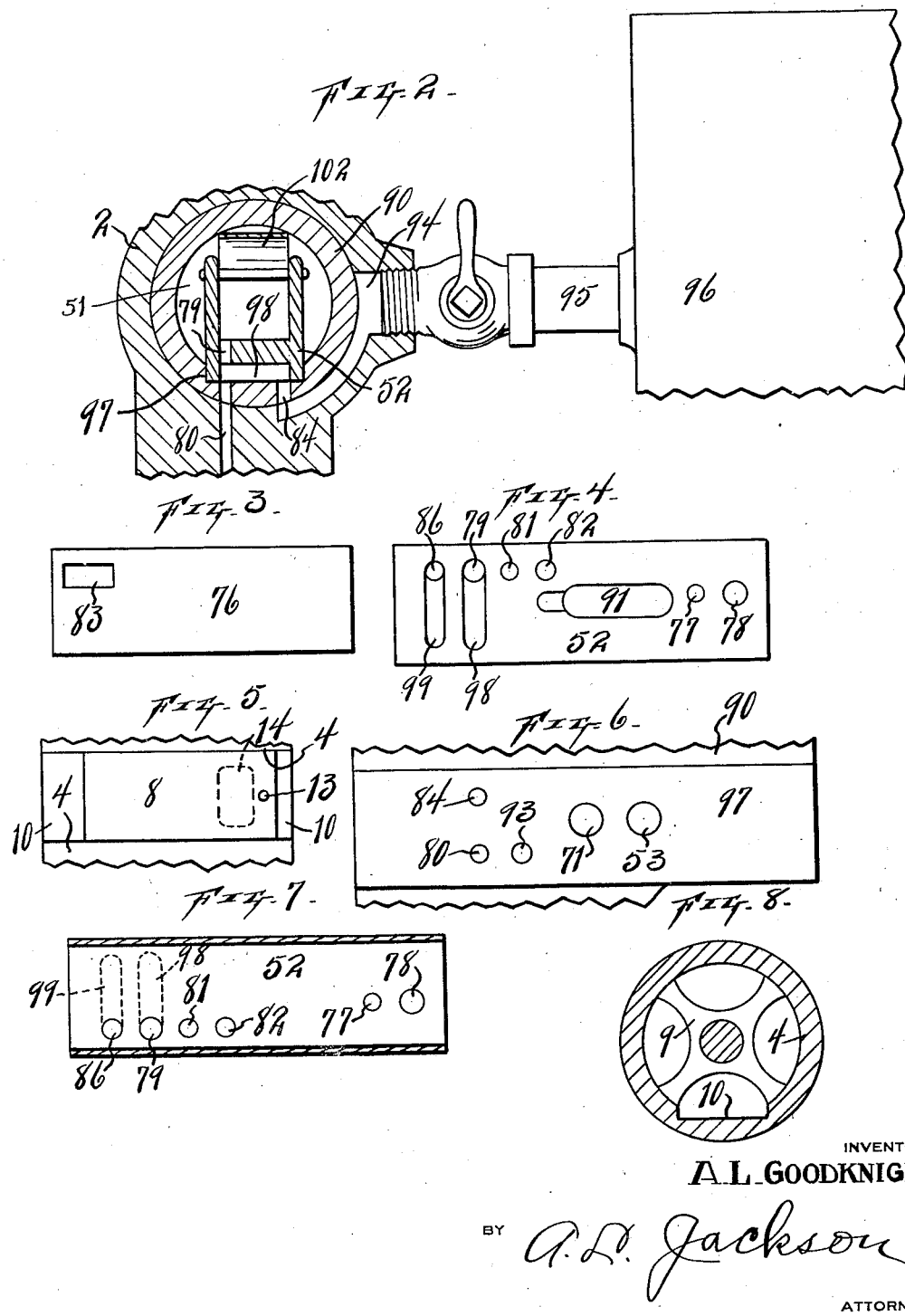
INVENTOR
A. L. GOODKNIGHT.
BY A. D. Jackson
ATTORNEY

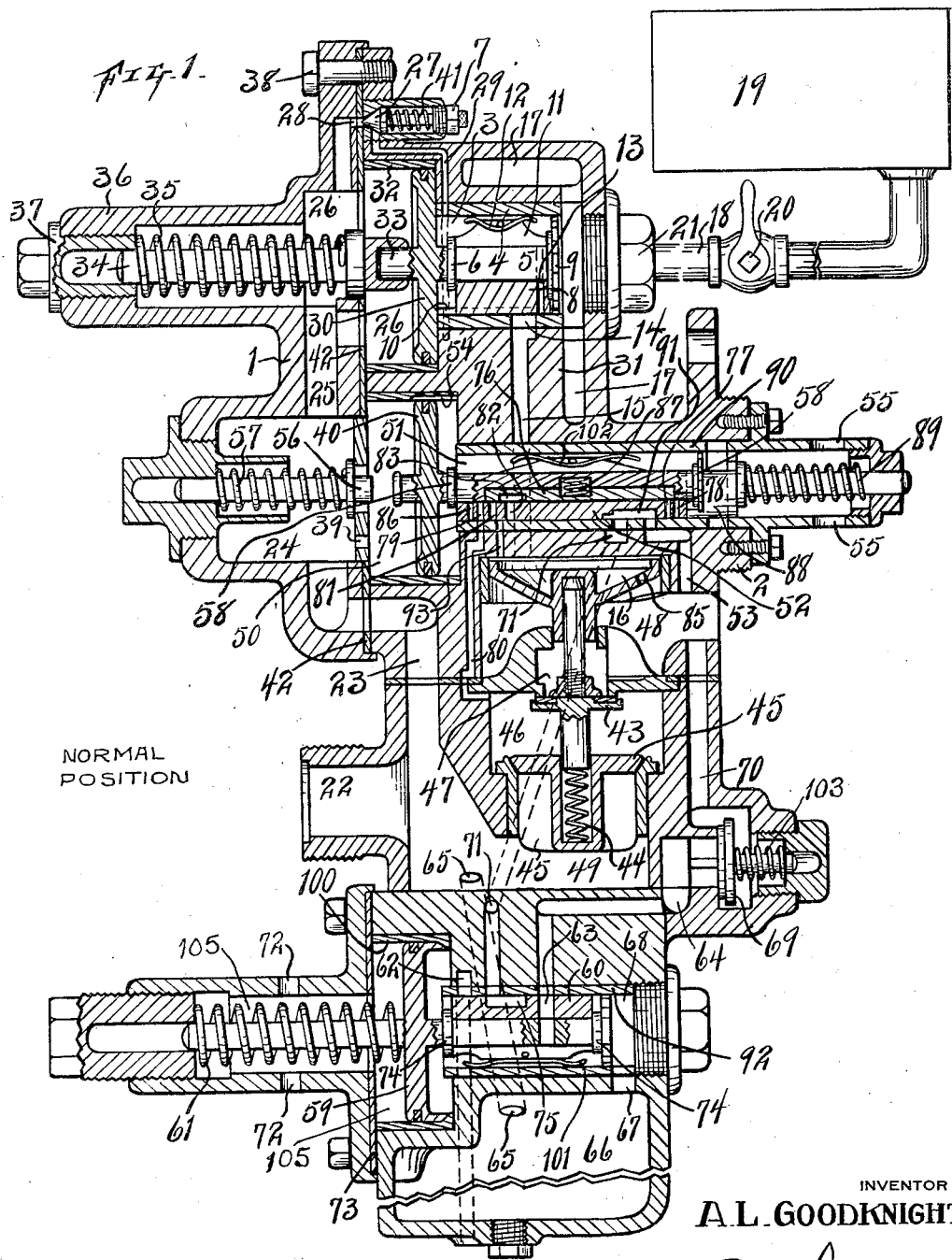

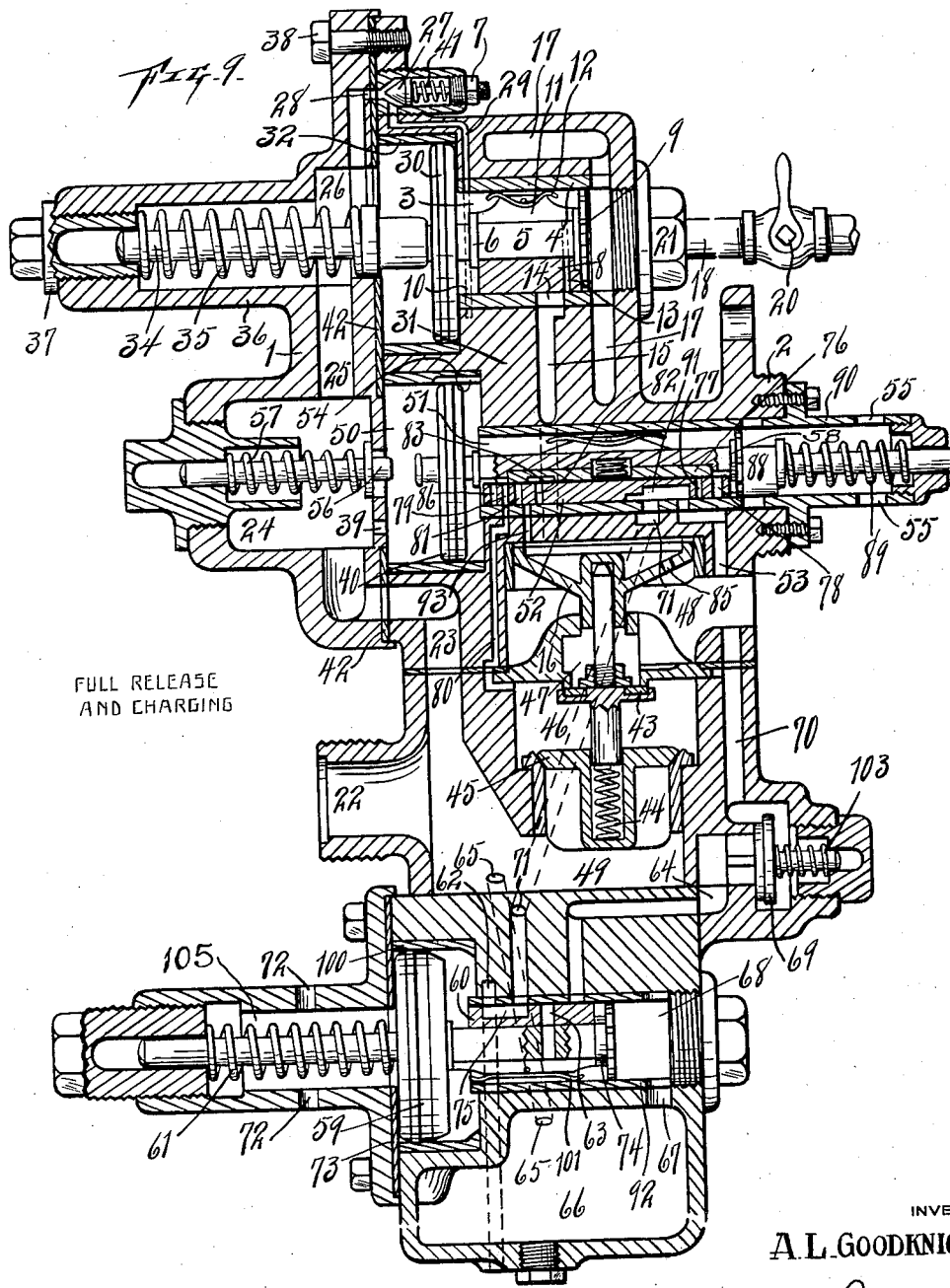

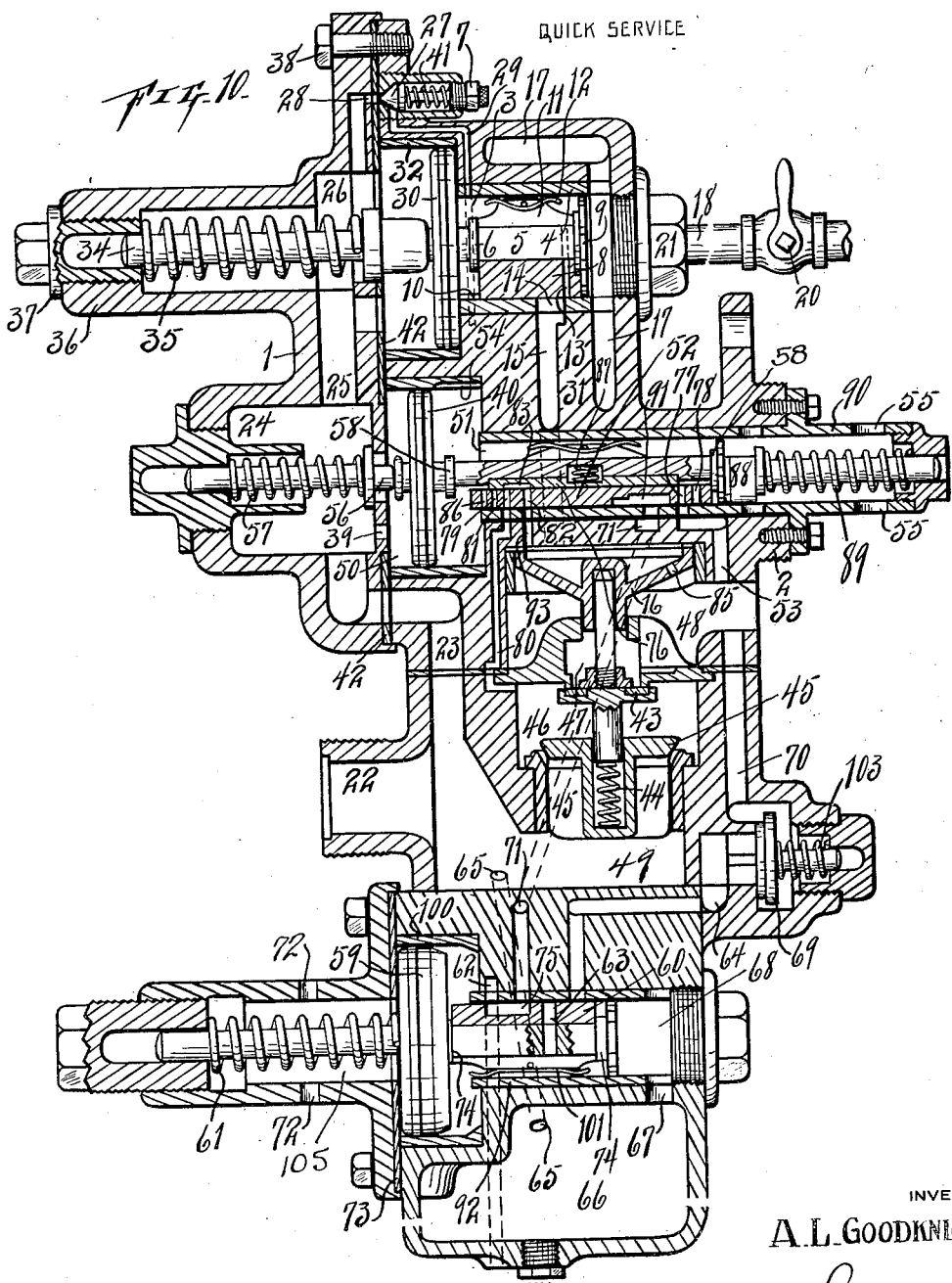

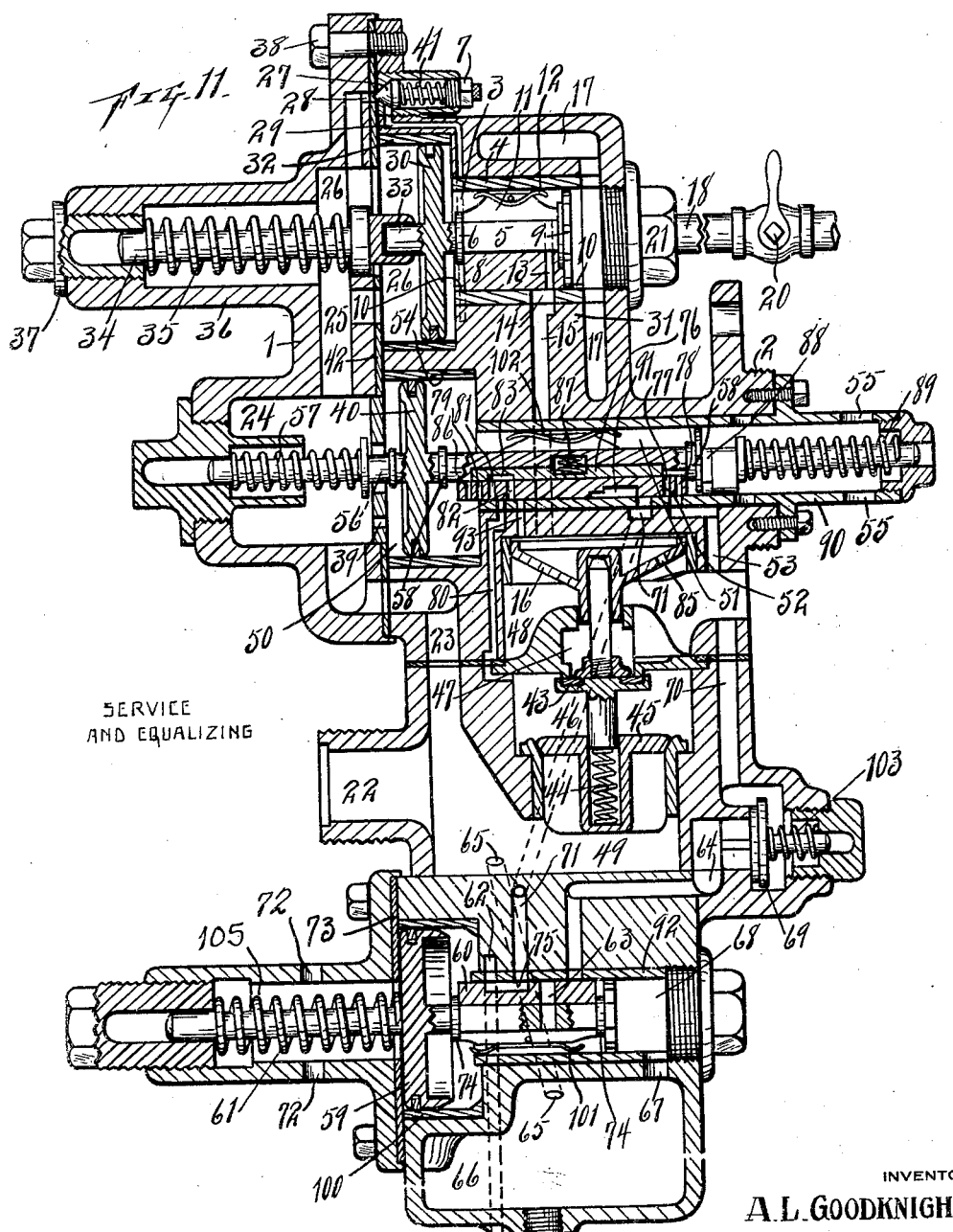

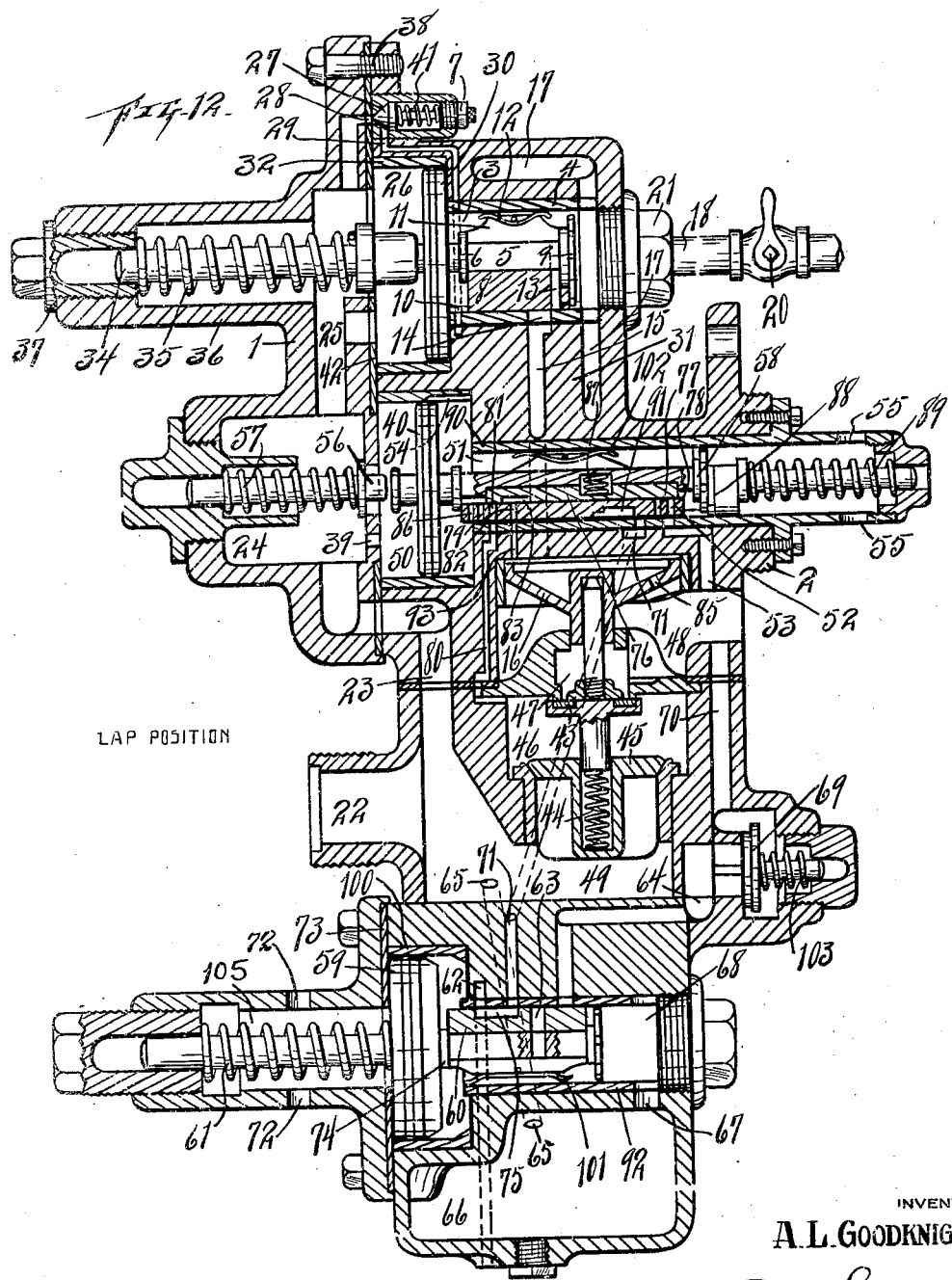

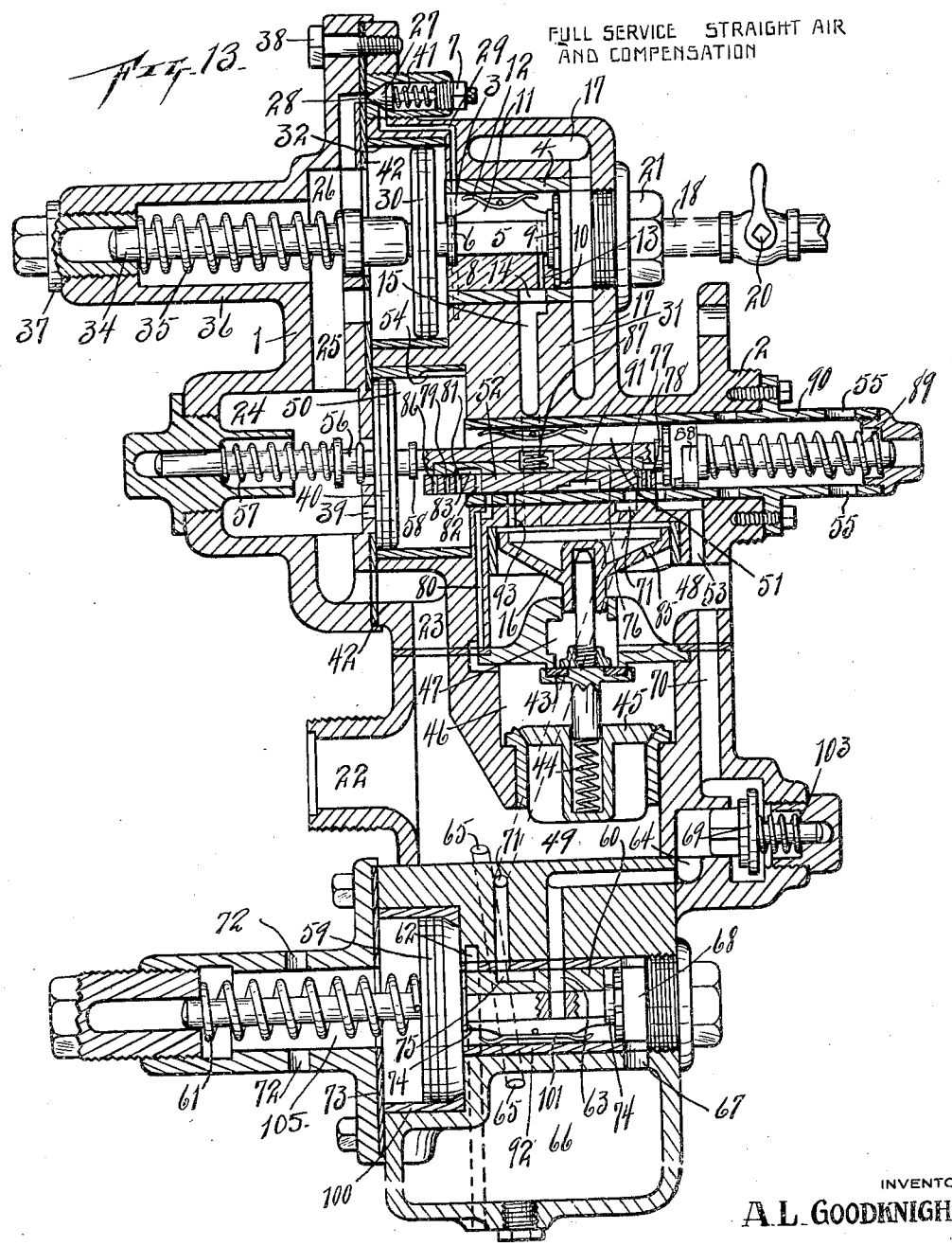

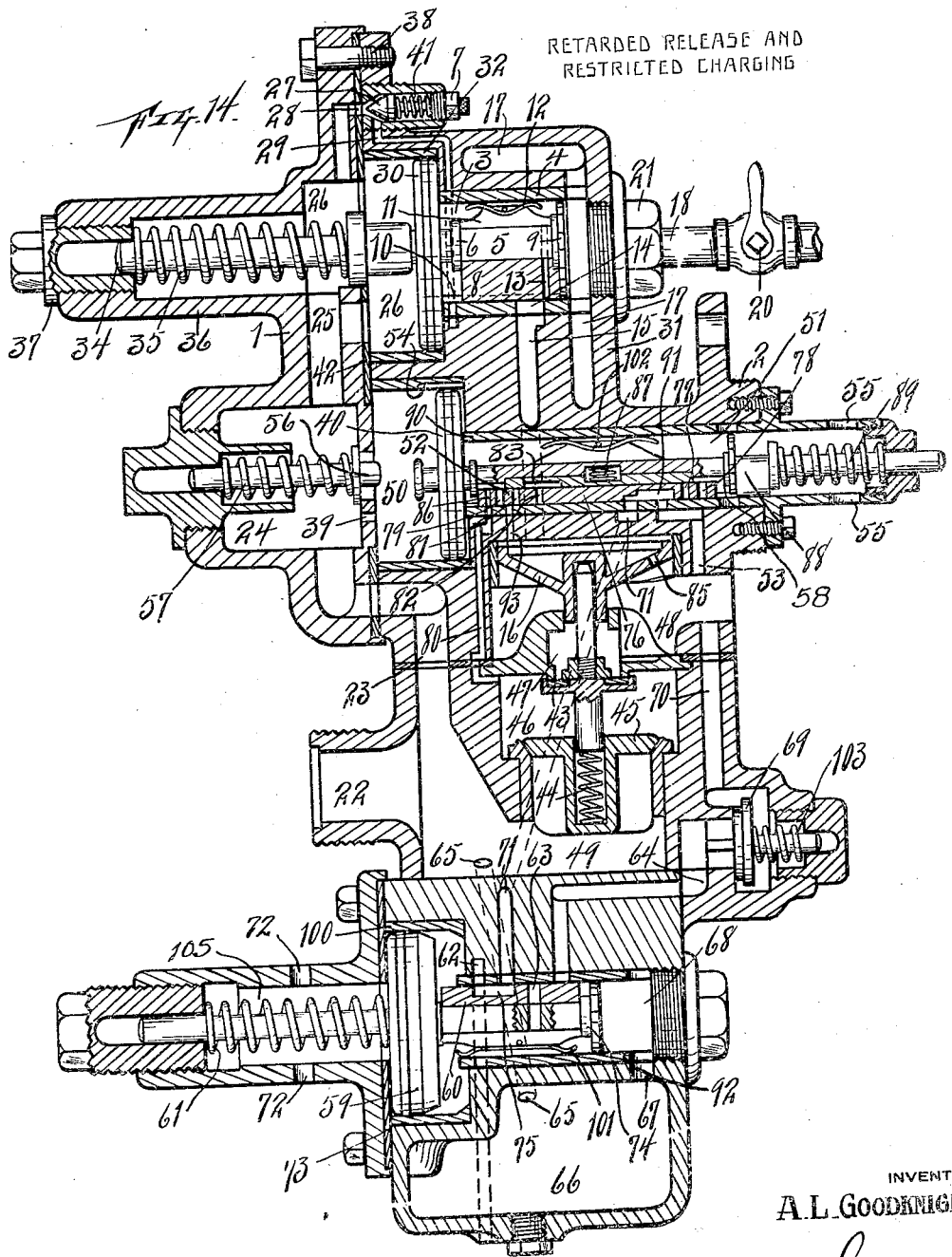

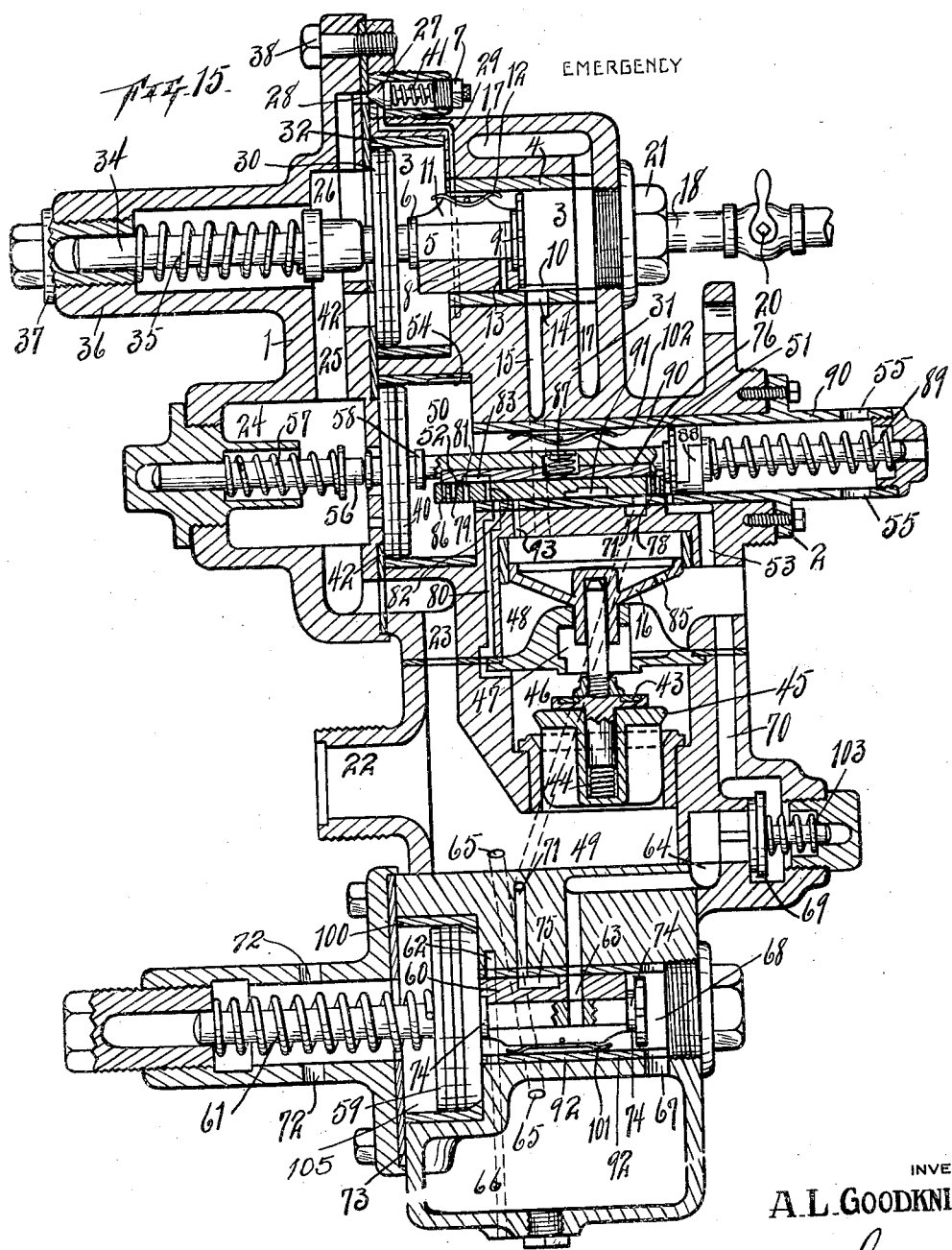

Dec. 8, 1931.   A. L. GOODKNIGHT   1,835,999
AIR BRAKE MECHANISM
Filed March 15, 1929   10 Sheets-Sheet 10
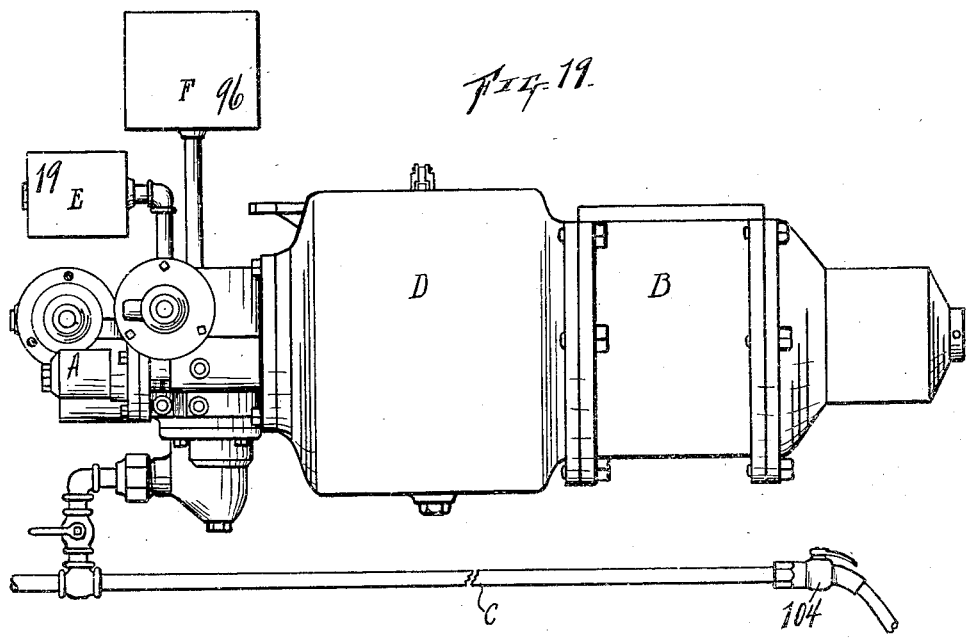
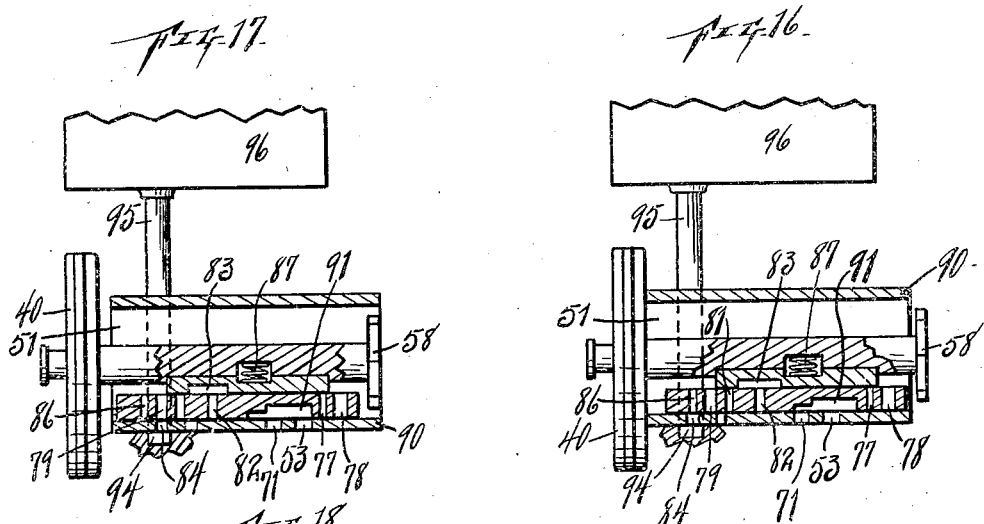
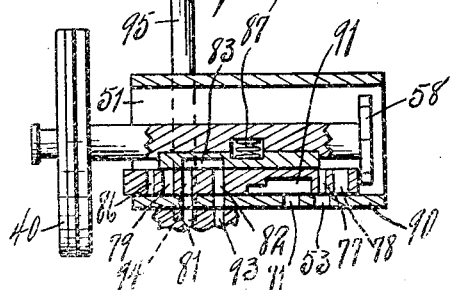
INVENTOR
A. L. GOODKNIGHT.
BY
A. D. Jackson
ATTORNEY Patented Dec. 8, 1931

1,835,999

UNITED STATES PATENT OFFICE

ALVA L. GOODKNIGHT, OF FORT WORTH, TEXAS

AIR BRAKE MECHANISM

Application filed March 15, 1929. Serial No. 347,267.

My invention relates to air brake mechanism and more particularly to automatic and automatic straight air brakes for railway cars, engines, trains, and vehicles of various types; and the object is to improve the air brake shown in my pending application, filed May 22, 1928, Ser. No. 279,718, Patent No. 1,736,910, Nov. 26, 1929, and the patents granted to me October 29, 1907, No. 869,837, and November 25, 1919, No. 1,322,783, and The principal object is to provide an improved mechanism of more simple construction by which a separate independent emergency application of the brake can be made without the liability of any defective emergency quick action while operating with quick or full service reduction of brake pipe pressure.

Another object of the invention is to provide improved means whereby an independent emergency application may be made following a quick or full service application of the brakes.

A further object of the invention is to provide improved means by which a quick release and recharge of the brakes can be made at all times without a manual adjustment of the valves.

A still further object of the invention is to provide improved means whereby a separate independent automatic and automatic straight air applications of the brakes can be made at all times without a manual adjustment of the valves.

A still further object of the invention is to provide improved means by which a greater braking power is available by reducing the equalizing drum pressure into the brake cylinder with the emergency piston and valve while making a service or full service application of the brakes.

A still further object of the invention is to provide improved means whereby a separate application of the brakes can be made with the emergency piston independent of the automatic service and automatic straight air pistons, and hold the brake cylinder pressure with the main valve or straight or direct valve, thus further guarding against a failure of the brake to operate.

With these and other objects in view, as will more fully hereinafter appear, the invention consists in certain novel features of construction and arrangements of parts, hereinafter fully described, illustrated in the accompanying drawings and more particularly pointed out in the appended claims, it being understood that various changes in form, proportions, size and shape and position and size of ports and minor details of the structure may be made without departing from the spirit or sacrificing any of the advantages of the invention.

Reference is had to the accompanying drawings, which form a part of this application.

Fig. 1 is a vertical longitudinal section of the duplex control valve and its cooperating parts.

Fig. 2 is a broken view, showing a section of the main slide valve and a broken elevation of the reserve drum.

Fig. 3 is a face view of the graduating slide valve.

Fig. 4 is a face view of the main slide valve.

Fig. 5 is a plan view of the reducing and emergency valve.

Fig. 6 is a seat for the main slide valve.

Fig. 7 is a face view of the seat for the graduating slide valve.

Fig. 8 is an end view of the guides for the emergency piston.

Fig. 9 is a vertical longitudinal section of the duplex control valve and its cooperating parts in quick release and charging position.

Fig. 10 is a vertical longitudinal section of the duplex control valve and its cooperating parts in quick service position.

Fig. 11 is a vertical longitudinal section of the duplex control valve and its cooperating parts in service and equalizing position.

Fig. 12 is a vertical longitudinal section of the duplex control valve and its cooperating parts in lap position.

Fig. 13 is a vertical longitudinal section of the duplex control valve and its cooperating parts in full service equalizing, and straight air application and compensation position.

Fig. 14 is a vertical longitudinal section of the duplex control valve and its cooperating parts in retarded release and restricted charging position.

Fig. 15 is a vertical longitudinal section of the duplex control valve and its cooperating parts in emergency position.

Fig. 16 is a broken sectional side elevation of the service valve in retarded release and restricted charging position of the ports 80, 86, extended groove port 99, ports 84, 94, pipe 95, and drum 96.

Fig. 17 is a sectional side view of the service valve in full release and charging position of ports 80, 79, extended groove port 98, ports 84, 94, pipe 95, and drum 96.

Fig. 18 is a sectional side view of the service valve in quick service port 80 and lap position of port 84.

Fig. 19 is a diagrammatic view of the assembled duplex control valve shown attached to the usual combined auxiliary reservoir and brake cylinder of a railway car.

The drawings show a piston casing 31 which is formed by an extension of the casing 2, which is the casing for the service application valve described in the above noted application. The casing 31 is provided for the improved emergency piston and valve. A drum chamber 3 is formed in the bushing 4 which is mounted in this extension 31. A piston stem 5 is mounted in the bushing 4 and provided with collars 6 for the purpose of actuating a slide valve 8. A guide 9 is integral with the piston stem 5 for holding the piston in true position as the piston is moved. The guide 9 moves in the bushing 4 for holding the piston in true position. The bushing 4 has a grooved seat and guide 10 for the slide valve 8. The slide valve 8 has wings 11 which project upwardly on both sides of the piston stem 5 and a spring 12 bears down on the wings 11 to hold the valve 8 seated. The valve 8 is provided with a reducing port 13 which is adapted to register with the emergency port 14 in the bushing which port 14 communicates with the main emergency port 15, which extends down to the emergency piston 16 of the above noted Patent No. 1,736,910. Means are provided for charging the valve chamber 3 and its extensions 17 and equalized drum 19 which communicates with the extensions 17 by means of a pipe 18 which is provided with a cock 20. The air pressure passes from chamber 3 through the perforated guide 9 to the extensions 17 and through pipe 18 to drum 19. For convenience of manufacturing purposes, the casing 31 is provided with a cap nut 21 which has a threaded opening therethrough for the pipe 18. The brake pipe pressure comes through the port 22, through the passage 23 into chamber 24 and thence up through the passage 25 to chamber 26. A check valve 27 normally closes a port 28 and a plug 7 holds the valve 27 and spring 41 in place. On a charging application, the brake pipe pressure will force the valve 27 open and pass through the port 29 to the chamber 3. A piston head 30 separates chamber 26 from the valve chamber 3. A bushing 32 is mounted in chamber 26 and the head 30 moves in this chamber. The head 30 is formed integral with the stem 5. An extension 33 is formed on the head 30 and projects into a socket in the end of the spring guide 34. The spring 35 is provided for exerting a constant pressure on the piston head 30. A housing 36 is provided on the cap 1 for the guide 34 and the spring 35, and the spring 35 is held in place by a hollow plug 37. The cap 1 is secured to the extension 31 by stud bolts 38.

A service port 39 is provided in the cap 1 for restricting pressure to and from the main piston 40.

The slide valve 52, shown in the above noted Patent No. 1,736,910, is now improved by extending the ports 79 and 86 by grooves 98 and 99 respectively. This arrangement will make port 79 communicate with port 84 through the groove 98 when the valve 52 is in full release position, and on a further movement inwardly the port 86 will communicate with the port 84 through groove 99 for restricted recharge and retarded release position. At the same time that port 79 communicates with port 84 and chamber 51, port 79 also communicates with quick service port 80 for the purpose of supplying pressure from reserve drum 96 to chamber 46 to hold the check valve 45 seated for a rapid increase of brake pipe pressure while making the release of the brakes. A spring 102 holds the slide valve 52 in its seat. It will further be observed that chamber 105 is an atmosphere chamber and that ports 72 are atmosphere ports.

In order to simplify and make clearer the air brake mechanism, a more comprehensive description of the duplex control valve, the various parts, and the ports and passages will now be more specifically described in connection with the various operations of the valve.

In the diagrammatic view, Fig. 19, A designates the duplex control valve, B the brake cylinder, C the brake pipe, D the auxiliary reservoir, E the emergency equalizing reservoir drum, and F the reserve reservoir drum.

Normal

Reference is had to Figs. 1, 2, and 11. This position occurs after all the air pressure has been bled from the valve and brake system, or while the pressure is below the resistance of the straight or direct air valve spring 61. The valve and its port will then assume its normal position ready to be charged, such as when the source of supply is attached to the brake upon a car or rather to those that comprise a train of cars, and the supply is turned thereto into the brake pipe for the usual charging of the system. Air will then flow from the brake pipe C through the passages 22, 23, chamber 24, service port 39 into chamber 50, through feed groove port 54 to the auxiliary reservoir chamber 51, thence pass through the ports 55 into the auxiliary reservoir D. At the same time, brake pipe air flows from passages 22 and 49, forces check valve 45 to rise from its seat and passes into the chamber 46, through ports 80 and 79 into chamber 51, combines with the air from the feed port 54, also flows through the extended groove port 98, ports 84, 94, and thence through pipe 95 into the reserve drum 96. In the mean time brake pipe air flows through passage 25, chamber 26, charging port 28, and forces the check valve 27 to move from its seat, compresses spring 41, then flows through passage 29 into chambers 3 and 17, thence through pipe 18 into the emergency equalizing drum 19. Air continues to flow into the above named auxiliary reservoir and the two drums until their pressures reach the normal equalization with that of the brake pipe. At the same time, the heavy tension spring 61, which is located on the atmosphere side of cup piston 59, holds the straight or direct air valve 60 to its normal inward position. The straight or direct air valve 60 is also a slide valve. Piston 59 is against its seat on the inner end formed integral with the bushing 100, slide valve 60 (held to its seat by spring 101) has closed the intermediate and final exhaust ports 71 and 62, registered the application port 63 with the brake cylinder port 64. Brake pipe air then flows straight or direct from passage 22 through passage 65, chamber 66, port 67 into the straight or direct air chamber 68, then flows through ports 63, 64, forces check valve 69 from its seat, compresses spring 103 and flows through passage 70 into the passage 48, thence into the brake cylinder B, (see Fig. 19) applies and holds the brakes set, (the parts occupying the positions as shown in Fig. 1), until the brake pipe pressure increases above the resistance of the application and holding spring 61. Then the piston is forced to yield outwardly to the left and compress the spring 61 until it seats against the gasket 73. Collars 74 move slide valve 60, blanks application port 63 from the brake cylinder port 64. Cavity 75 registers the intermediate and final exhaust ports 71 and 62, and as slide valve 52 has caused the cavity 91 to connect the brake cylinder port 53 with the intermediate exhaust port 71, the brake cylinder pressure is then discharged to the atmosphere through the above named ports, then the brakes assume the positions as shown in Figs. 9, 17, and 2, and which positions are described in connection with the description and illustration of quick release and charging. If, however, during this latter stage of operation, the emergency equalizing drum 19 is overcharged while the full high excess pressure is allowed to flow back into the brake pipe C of the system a longer period than necessary, then lowered to the normal equalization position after the release is accomplished. The excess pressure thus created in chambers 3 and 17 and drum 19 will then force piston 30 and its slide valve 8 out to the left and register port 13 with port 14. The excess pressure will then flow out to the atmosphere through ports 13 and 14, passage way 15, port 85, passage 48, port 53, cavity 91, port 71, cavity 75, and the final exhaust port 62, which is open in the full release position.

*Quick release and charging*

Reference is had to the positions of the valve shown in Figs. 2, 17, and 9. For causing the valve A to assume the full quick release and charging position following a brake application, air in large volume is admitted from the source of supply into the brake pipe C of the system. It flows through passages 22 and 23 into chamber 24, thence through service port 39 into the chamber 50. As soon as the brake pipe pressure is enough greater than the auxiliary reservoir pressure remaining in chamber 51 to overcome the friction of piston 40, graduating slide valve 76, and slide valve 52, all three are moved inwardly toward the right until the stem and collars 58, strike the retarding stem 88, and opens feed groove 54. Brake pipe air from chamber 50 then flows into chamber 51, thence through ports 55 into the auxiliary reservoir. At the same time slide valve 52 registered port 79 with port 80 and also registered the extended groove port 98 with port 84. Air from the reserve drum 96 flows through pipe 95, ports 94, 84, groove port 98, down through port 80 into chamber 46 to the top of check valve 45, holds the latter seated against the brake pipe pressure in passage 49. At the same time a part of the air branches off and flows up through port 79 into the auxiliary reservoir chamber 51 and combines with the air flowing through the feed groove port 54. Also at the same time, brake pipe air flows from chamber 24 through passage 25 into chamber 26 and feed port 28, and forces check valve 27 to move from its seat, compresses spring 41, passes through port 29 into chambers 3 and 17, thence through pipe 18 into the emergency equalization drum 19. Air continues to flow from the brake pipe C to the equalizing drum 19 until the latter is fully charged equal with that of the brake pipe C. As soon as the pressure in reserve drum 96 and chamber 46 becomes slightly less than brake pipe pressure, the latter pressure in passage 49 will then force check valve 45 from its seat, compresses spring 44, and flows into chamber 46, through passage 80, port 79 into chamber 51, combines with the air from feed groove port 54, thence passes through ports 55 into the auxiliary reservoir D. (See Fig. 19). Air also passes from port 80 through the extended groove 98, ports 84, 94, and thence through pipe 95 into the reserve drum 96, continues further recharge of the auxiliary D and reserve drum 96 until both pressures reach the normal equalization with that of the brake pipe, C. At the same time brake pipe pressure flows straight or direct from passage 22 through port 65, chamber 66, port 67, into chamber 68. As soon as the pressure becomes greater than the resistance of the straight or direct air valve spring 61 and the frictional resistance of piston 59 and slide valve 60 held to its seat by spring 101, the two are then forced to yield outwardly and to compress spring 61 until piston 59 seats against gasket 73. Slide valve 60 blanks application port 63 and closes the brake cylinder port 64 and cavity 75 registers the intermediate exhaust port 71 with the final exhaust port 62, and as the slide valve 52 has caused cavity 91 to register brake cylinder port 53 with the intermediate exhaust port 71, pressure from the brake cylinder is then discharged to the atmosphere through passage 48, port 53, cavity 91, port 71, cavity 75 and thence out through the final exhaust port 62. The brakes are then fully released and recharged. The period of time that the reserve drum normal pressure holds the check valve 45 seated and chamber 46 closed to brake pipe pressure aids the latter pressure to build up more rapidly throughout the entire train and thus cause a quick release of the brakes.

Quick service

Reference is had to Figs. 10 and 18 to cause a quick service application of the brakes. Air pressure is gradually reduced in the brake pipe C, passage 22, chamber 24, and thereby in chamber 50 through service port 39. This causes a preponderance of pressure in the auxiliary reservoir chamber 51. As soon as the remaining pressure in the auxiliary reservoir D and the chamber 51 becomes enough greater than that in chambers 24 and 50 to overcome the friction of piston 40 and graduating slide valve 76, these two then move outwardly to the left until the shoulder on the end of the piston stem and guide 58 strike against the right hand end of the slide valve 52, where it also is moved to the left until the piston 40 strikes the graduating stem 56, which is held in its place by the compression of the graduating spring 57. The ports of the valve are then in the position shown in Figs. 10 and 18. The first movement of the graduating valve 76 closes the feed groove 54, preventing air from feeding back into the brake pipe C. from the auxiliary reservoir D, and also opens the small quick service port 77 in the slide valve 52, while the movement of the latter closes the connection between port 53 and the exhaust port 71 and brings the small quick service port 77 into registration with port 53 in the seat of slide valve 52. Auxiliary reservoir pressure then flows through port 77 in the slide valve 52 and port 53 to passage 48, and thence into the brake cylinder B. At the same time the first movement of the graduating slide valve 76 connected the two ports 81 and 82 in slide valve 52 by the cavity 83 in the graduating slide valve 76, and the movement of the slide valve 52 brought port 81 to register with port 80 in the slide valve seat, (as shown in Figs. 10 and 18) and port 82 with port 93. In this position slide valve 52 has the reserve drum port 84 blank, and the full normal pressure is thus retained in the reserve drum 96, as shown in Fig. 18. Consequently the air pressure in chamber 46 flows through ports 80, 81, cavity 83, ports 82, and 93, and passes through port 85 in the cup piston 16, combines with pressure from the auxiliary reservoir D. in passage 48, thence passes into the brake cylinder B. (See Fig. 19.) When the pressure in chamber 46 has reduced below the brake pipe pressure remaining in passages 22 and 49, check valve 45 is then forced to rise from its seat compress spring 44 and allow brake pipe air to flow by the same, and through the ports above mentioned to the brake cylinder B. The size of these ports is so proportioned that the flow of air from the brake pipe C. to the top of the emergency piston 16 is not sufficient to depress the latter and thus cause an emergency application. But at the same time this will take considerable air from the brake pipe C, thus increasing the rapidity with which the brake pipe reduction travels through the train. Also at the same time there will be a light quick service application. The emergency piston 30 and slide valve 8 are forced to remain seated in normal position, due to the heavy tension of spring 35 which it constantly exerts against the piston 30 (see Figs. 10 and 18). Consequently no air pressure is reduced from the emergency equalizing chambers 3, 17 and drum 19, and as brake pipe pressure has not been reduced below the resistance of the straight or direct air valve spring 61, the straight air valve thus remains in its release position as shown in the Fig. 10. However in the service operation of the brakes, it will be observed that the piston 40 is controlled on the outer side by the flow of brake pipe air through service port 39 and on the inside by the flow of auxiliary reservoir air through service port 53 to the brake cylinder B, as shown in the accompanying drawings, (see Figs. 10 and 18) consequently no heavy, sudden reduction to the brake pipe pressure in chambers 50 and 51 can be caused by the service piston 40, during service applications of the brakes upon a train.

Service and equalizing

Reference is had to Fig. 11. To cause the service application of the brakes, the reduction of pressure in brake pipe C, is made more rapid than that of the auxiliary reservoir D. The difference in pressure on both sides of piston 40 soon becomes sufficient to move the piston to the left, compresses graduating spring 57, causing slide valve 52 to move far enough to register larger service port 78 with port 53. In this position quick service port 80, and reserve drum port 84 are closed, so that no air flows from the brake pipe C. to the brake cylinder B. and the normal pressure in the reserve drum 96 is yet retained therein. (See Figs. 12 and 18.) The brake pipe reduction being sufficiently rapid, there is no need of the additional quick service reduction and is thus automatically cut out. The service port 78 in slide valve 52 has port 53 fully open, which allows the auxiliary reservoir pressure to reduce more rapidly so as to keep pace with the more rapid brake-pipe reduction, while the service application of the brake is taking place. The greater reduction of brake-pipe pressure causes a sufficient preponderance of pressure in the emergency chambers 3, 17 and drum 19 to overcome the brake-pipe pressure in chamber 26 and the resistance of spring 35. The emergency piston 30 and slide valve 8, held with collars 6, are then forced to move outwardly to the left to compress spring 35 sufficiently enough to register the reducing port 13 with the port 14 and passage 15. The pressure in the emergency equalizing chamber 3 then flows through the above named ports and passage to the top of the emergency cup piston 16, passes through port 85 in the latter into the passage 48, and combines with the auxiliary reservoir D. pressure, thence passes into the brake cylinder B. and thus causes a greater pressure for a given brake pipe reduction. As soon as the pressure in chambers 3, 17 and drum 19 becomes nearly equal with that of the brake pipe C. and less than the resistance of spring 35, the latter will then force piston 30 and slide valve 8 inwardly to the right until the piston 30 seats against bushing 4. In normal position slide valve 8 uncovers port 29 and closes port 14 and blank port 13. Check valve 27 is normally held to its seat by spring 41. The feed port 28 is thus closed and the pressure in chamber 3 is therefore prevented from flowing back into the brake-pipe C. As the emergency piston 30 and slide valve 8 are held in their normal position by the heavy spring 35 and the equalization of pressure in chambers 3, 17 and the reservoir drum 19, with that of the brake-pipe C, the emergency application is therefore available at all times as shown in Figs. 1, 9, 10, 11, 12 and 14 of the accompanying drawings. If however, any excess pressure is created in chambers 3, 17 and drum 19 after the brake has been released the piston 30 and slide valve 8 will automatically operate as above described, and the excess pressure will be reduced through ports 13 and 14, passage 15, port 85, passage 48, port 53, cavity 91, intermediate exhaust port 71, cavity 75, and the final exhaust port 62 to the atmosphere instead of flowing into the brake cylinder D. while the brake is being applied with the service applications.

Lap

Reference is had to Figs. 12 and 18. When the brake pipe reduction ceases, air continues to flow from the auxiliary reservoir D. through ports 77, 53 and passage 48 to the brake cylinder B. until the pressure in the auxiliary reservoir chamber 51 becomes enough less than that of the brake pipe pressure in chamber 50 to cause piston 40 and the graduating slide valve 76 to move inwardly to the right until the shoulder 58 on the piston stem strikes the left hand end of slide valve 52. As the friction of piston 40 and the graduating slide valve 76 is enough less than that of the slide valve 52, the difference in pressure which will move the piston 40 and the graduating slide valve 76 will not be sufficient to move all three; consequently, the piston 40 stops in the position shown in Fig. 12 of the above named drawings. This movement has caused the graduating slide valve 76 to close ports 77 and 81, and hold the feed groove 54 blank, thus cutting off any further flow of air from the auxiliary reservoir. Consequently no further change in air pressures can occur. This position is so called "Lap" because all ports are blank, or in other words closed, as shown in Figs. 12 and 18.

Full service, straight air and compensation

Reference is had to Fig. 13. To cause the full service straight or direct air compensation application of the brake, the reduction of pressure in the brake-pipe C. is made more rapid and below brake cylinder equalization, or less than the straight or direct air valve spring 61 resistance. The more rapid reduction of brake-pipe pressure in passage 22, chamber 24 and thereby in chamber 50 through service port 39, than that of the auxiliary reservoir D. causes the difference in pressures on the two sides of piston 40, to quickly become sufficient to compress the graduating spring 57, until the piston seats against the gasket 42, and move the slide valve 52 to the position shown in Fig. 13. In this position quick service port 80, reserve drum port 84 and feed groove port 54 are closed from the brake pipe C., and the full normal pressure in the reserve drum 96 is still retained for the purpose of assisting in the recharge of the auxiliary reservoir D., and to further aid the brake pipe pressure, (see Fig. 18 lap position of port 84) to build up more rapidly for making a quick release of the brakes. The back or right end of slide valve 52 uncovers the brake cylinder port 53 and the auxiliary reservoir air flows into passage 48, combines with that pressure reducing from the emergency equalizing chambers 3, 17 and drum 19, through ports 13 and 14, passage 15 and port 85 in the cup piston 16, thence passes into the brake cylinder B., and applies the brake with a greater brake cylinder pressure. Since the brake pipe pressure in passages 22, 65, chamber 66, port 67 and chamber 68 is reduced to slightly less than the resistance of application spring 61 of the straight or direct air valve 60, the piston 59, and slide valve 60, are then forced inwardly to the right by the tension of the spring 61. As the latter is located on the atmosphere side of piston 59, it causes the piston 59 to move in against the brake pipe pressure in chamber 68. Application port 63 in slide valve 60 registers with the brake cylinder port 64, brake pipe air in chamber 68, then flows straight or direct through ports 63 and 64, forces the check valve 69 from its seat, compresses spring 103, then flows through the passage 70 into the passage 48 and combines with the pressure from the auxiliary reservoir D, and the equalizing drum 19, thence passes into the brake cylinder B, and makes an application independent of the service or emergency valve operations. It will then also compensate for any brake cylinder leakage and hold the brake set with straight air. As the same movement of piston 59 caused it to stop against its seat formed integral on the inner end of the bushing 100, cavity 75, in slide valve 60, disconnected the intermediate exhaust port 71 from the final exhaust port 62 and the brake is thus held, set independent of the service slide valve 52. The air pressure in the equalizing chambers 13, 17 and drum 19, reduce as described in service and equalizing, (see Fig. 11) to equalization with the brake pipe, then the heavy tension spring 35 aided by brake pipe pressure causes piston 30 and slide valve 8 to move in to their normal seat, uncover port 29, close port 14 and blank port 13, as shown in Fig. 1. The release of the brake is accomplished in the usual manner as shown and described in quick release and charging, also retarded release and restricted charging; shown and described in Figs. 9, 14, 16 and 17.

*Retarded release and restricted charging*

Reference is had to the diagrammatic view of the valves position shown in Figs. 14 and 16. To cause the valve 52, and piston 40 to move to the retarded release and restricted recharge position, it must be located in the front end of a long train. For example, composed of 100 cars, when the excess pressure in large volume is turned into the brake pipe from the source of supply following an application of the brakes, the brakes towards the front end of the train receiving the air first will have their brake-pipe pressure raised more rapidly than those in the rear. The friction of the brake-pipe causes the pressure in chambers 24 and 50 to build up more rapidly on the valves towards the front than those in the rear. As soon as the brake-pipe pressure is enough greater than the auxiliary-reservoir pressure, remaining in chamber 51, to overcome the friction of piston 40, graduating valve 76, and slide valve 52, all three are then moved inwardly toward the right until the piston stem with guides and collar 58 strikes the retarding-device stem 88, and as the rate of increase of the brake pipe pressure builds up the pressure more rapidly in chambers 24 and 50 than the auxiliary-reservoir D can recharge, the excessive pressure in chamber 50 will then cause the piston 40 to compress the retarding-device spring 89, and further move the valve parts inwardly until piston 40 seats against bushing 90, closes feed groove 54 from the auxiliary reservoir chamber 51, slide valve 52, registers the restricted port 86 and its extended groove port 99 with ports 80 and 84. Air in the reserve drum 96 will then flow through pipe 95, ports 94, 84, groove port 99, down through port 80 into chamber 46 to the top of check valve 45, holds the latter closed against the brake-pipe pressure in passage 49, also flows up through port 86 into the auxiliary reservoir chamber 51, thence passes through ports 55 into the auxiliary reservoir. As soon as the pressure in the reserve drum 96 and chamber 46 becomes slightly less than brake-pipe pressure, the latter pressure in passage 49 will then force check valve 45 to rise from its seat flow into chamber 46 then through passage 80, port 86 into chamber 51 thence passes through ports 55 into the auxiliary reservoir D, also passes from port 80 through the extended groove 99, ports 84, 94, thence through pipe 95 into the reserve drum 96, continues the further recharge of the auxiliary reservoir D. and reserve drum 96, until both pressures reach the normal equalization with that of the brake-pipe, or until the auxiliary reservoir pressure rises, and the pressures on the two sides of piston 40 becomes nearly equal, the retarding device spring 89 will then force the piston 40, slide valve 52, graduating valve 76, and retarding device stem 88 back to the full release position, (see Fig. 2) and as shown and described in Fig. 9, although the valves near the source of supply commence to release before those in rear portion, yet the exhaust of brake cylinder pressure in retarded release position is sufficiently slow to allow the rear brakes to release first in full release position on very long trains at a low rate of speed without shock or break in parts. The area of port 86 is about half less than when the valve is in the full release position. Exhaust cavity 91 in slide valve 52 now connects port 53 leading to the brake cylinder with the intermediate exhaust port 71 to the final exhaust port 62, which is open to the atmosphere; and the brake will release; but as the small extension of the cavity 91 is over the intermediate exhaust port 71, discharge of air from the brake cylinder B. to the atmosphere is quite slow, and in this way the brakes on the front portion of the train require a longer period of time to release than those on the rear. In this position of the valve the equalizing chambers 3, 17 and drum 19, are recharged with air from the brake-pipe C., which flows through passages 22, 23, chamber 24, passage 25, chamber 26, feed port 28, forces check valve 27 from its seat, compresses spring 41 passes through port 29 into chambers 3 and 17, thence through pipe 18 into the drum 19, until the pressure becomes equalized with that of the brake-pipe. When that takes place, spring 41 forces the valve 27 to its seat and thus prevents any backward flow of pressure to the brake pipe C. In the meantime the heavy tension spring 61 located on atmosphere side of the cup piston 59, and opposite side of brake pipe pressure, the latter having been previously reduced to less than the resistance of the former, causes spring 61 to force the piston 59 and slide valve 60 to move inwardly to the right against the brake-pipe pressure and thus assume their normal application and holding position. Slide valve 60 closes the final exhaust port 62 and blanks the intermediate exhaust port 71, and registers the application port 63 with the brake cylinder port 64, brake pipe air then flows straight or direct through passages 22 and 65, chamber 66, port 67 into the straight or direct air chamber 68, passes straight or direct into the application port 63, brake cylinder port 64, forces check valve 69 to move from its seat, compresses spring 103, flows through passages 70 and 48, thence into the brake cylinder B, and holds the brake set, until the brake-pipe pressure increases above the resistance of the tension of spring 61. As soon as that takes place, brake-pipe pressure in chamber 68 will then overcome the resistance of the spring 61 and force the piston 59 to yield outwardly to the left and compress spring 61, until it seats against the gasket 73. Collars 74 move slide valve 60 and causes it to blank application port 63, and close the brake cylinder port 64. Cavity 75 registers the intermediate exhaust port 71 with the final exhaust port 62. Brake cylinder pressure is then discharged to the atmosphere. The brakes are thus slowly released on the front end of the train, while those in the rear are released in full release position. The auxiliary reservoir D and the reserve drum 96 continue to recharge until their pressures reach the normal equalization with that of the brake pipe C. Then it is again available for another application of the brake, as shown in Fig. 9 and described in quick release and charging.

*Independent*

To cause the independent automatic operation of the brake upon a car or rather upon the cars of a train, (see Fig. 9) the source of supply is detached or, if however, an angle cock valve 104 in brake pipe C. is from some cause, turned to a closed position and the brake-pipe supply is therefore cut off to the rear, in any portion of the train, and the brake pipe leakage would be slow enough to reduce the pressure in chamber 50 through the port 39 at the same rate as that of the auxiliary reservoir D, could flow back into the brake pipe chamber 50, through the feed groove port 54, without causing a preponderance of auxiliary reservoir pressure to overcome the frictional resistance of the piston 40, and slide valve 52, and thus fail to operate the valve and apply the brake. Then, as soon as the brake pipe pressure would become slightly lower and less than the resistance of the straight or direct air valve spring 61, the latter will then overcome the resistance of the brake pipe pressure and the frictional resistance of the piston 59, and slide valve 60, and force the latter actuating parts inwardly to the right in normal position, (see Fig. 1) cavity 75 in slide valve 60 will close the intermediate exhaust port 71 from the final exhaust port 62. The application port 63 will register with the brake cylinder port 64, passages 70 and 48. Brake pipe air in chamber 68 will then flow straight or direct through the above named ports and passages, thence into the brake cylinder B, and apply the brakes upon all cars behind the closed angle cock valve 104. When the conditions as above described occurs the valves are in the position shown in Fig. 9, and described in quick release and charging position. The first position that the valve then assumes is shown in Fig. 1, and described in normal position. The second and third positions are shown in Figs. 11 and 13, and thus described in service and full service positions. The release of the brakes, however, can only be accomplished by the return of the angle cock valve 104 to the normal open position and the source of supply again admitted to the depleted brake pipe C. Then the brakes will be released as shown in Fig. 9, and described in quick release.

Emergency

Reference is had to Fig. 15, to cause the emergency application. Quick action is caused by a sudden and considerable reduction in brake-pipe pressure, no matter how caused, this quick sudden fall in brake-pipe pressure causes the difference in pressures on the two sides of piston 30 to increase very rapidly, so that the resistance of spring 35, and the friction of piston 30, and slide valve 8, is quickly and greatly overcome, and they move outwardly to the left with such sudden force that it compresses the heavy tension spring 35, until it seats against gasket 42. Stem 5 and collars 6 move slide valve 8 far enough to close port 29, so that port 13 is blank, and until the right or backward end uncovers the large port 14, allows the pressure from chambers 3, 17 and the equalizing drum 19 to flow through port 14 and passage 15 in large volume into the top of the emergency cup piston 16, causes it to instantly depress, force vent valve 43 from its seat and compress spring 44. Brake-pipe air in passages 22 and 49 then force check valve 45 from its seat, enters chamber 46, flows in large volume through port 47, passage 48, combines with that from the auxiliary reservoir and the equalizing drum pressure from the ports 53 and 85, thence passes into the brake cylinder B, and thus applies the brakes instantly with a greater pressure. As soon as the brake-pipe pressure becomes enough less than the brake cylinder pressure and the resistance of the spring 44, the latter will then force vent valve 43 and the check valve 45 to their seats and close vent port 47. Both valves are then again in their normal position. At the same time of the emergency application, the pressure in chamber 50 is reduced through the service port 39. This causes a preponderance of pressure in the auxiliary-reservoir D, and chamber 51, the difference in pressures on the two sides of piston 40 soon becomes sufficient to quickly move the latter and compress spring 57 until it seats against gasket 42. Collars 58 move slide valve 52 and close the intermediate exhaust port 71. This causes the right or back end of the slide valve 52 to uncover the brake cylinder port 53, allows the auxiliary-reservoir air to flow through the latter port into passage 48, combines with the pressures from the equalizing drum 19, flowing through port 85, and that of the brake-pipe C, flowing from the large port 47 into the passage 48. In the meantime as soon as the brake-pipe pressure in chamber 68 becomes enough less than the resistance of the heavy tension of application spring 61, the latter will then force piston 59 and its slide valve 60 inwardly to the right against the brake pipe pressure in chamber 68 until the piston stops on its seat which is formed integral with the inner end of bushing 100. Slide valve 60 causes cavity 75 to disconnect and close the intermediate and final exhaust ports 71 and 62. Application port 63 registers with the brake cylinder port 64, passages 70 and 48. Brake-pipe air is then free to flow straight or direct into the brake cylinder B, through the above named ports and passages and thus compensate and hold the brake set regardless of any brake cylinder leakage, as shown in Fig. 13, and described in full service and straight air and compensation position.

Release after emergency

Reference is had to Figs. 1, 9, 14, 16, and 17, to cause the valve to assume the release position after the emergency application, air in large volume is admitted from the source of supply into the brake pipe of the system. It flows through passages 22 and 23, chamber 24, service port 39, into chamber 50, at the same time pressure flows through passage 25 into chamber 26. As soon as the brake-pipe pressure becomes near equal with the remaining pressure in chambers 3, 17 and drum 19, the heavy tension spring 35 will then overcome the frictional resistance of piston 30, slide valve 8, and the remaining pressure in the above named chambers and drum, then force piston 30, and slide valve 8 inwardly to the right until the piston seats against the bushing 4, uncover port 29, blank port 13 and close port 14. At the same time as the brake-pipe pressure becomes enough greater than the remaining pressure in the auxiliary reservoir chamber 51, and the frictional resistance of piston 40, graduating slide valve 76 and slide valve 52, all three are then forced to move inwardly to the right until the stem and collar 58 strike the retarding device stem 88, opens feed groove port 54. Brake pipe air from chamber 50 then flows into chamber 51, thence through ports 55 into the auxiliary reservoir D. Also at the same time pressure flows from chamber 26, through port 28 forces check valve 27 from its seat compresses spring 41, passes into the passage 29 to chambers 3 and 17 thence through pipe 18 into drum 19. Also at the same time slide valve 52 registers ports 79 and 80 with port 84, through the extended groove 98. The full normal pressure retained in the reserve drum 96 during the application of the brake then flows through pipe 95, ports 94 and 84, extended groove 98, ports 79 and 80 to chamber 46. The high pressure created in the latter chamber holds check valve 45 seated against brake pipe pressure in passage 49, while it flows through port 79 into chamber 51, assists feed port 54 to recharge the auxiliary reservoir D, until it becomes slightly less than brake-pipe pressure, the latter pressure becoming greater than the former causes brake pipe pressure to force check valve 45 from its seat. The air then flows into chamber 46 passes through ports 80 and 79 into chamber 51, combines with the air from feed port 54, thence passes through ports 55, into the auxiliary reservoir D, while at the same time pressure passes from port 80 through the extended groove port 98 into ports 84 and 94, thence through pipe 95 into the reserve drum 96, continues the further recharge of the auxiliary reservoir D, and reserve drum 96, until the pressure of the former and latter reach the normal equalization with that of the brake pipe C. In the meantime brake pipe pressure flows straight or direct from passage 22 through passage 65, into chamber 66, through port 67, then into chamber 68. As soon as the pressure becomes enough greater than the resistance of the straight air valve spring 61, the piston 59, and slide valve 60 will then be forced to move outwardly to the left and compress spring 61, until the piston 59 seats against the gasket 73, slide valve 60 will blank application port 63 and close brake cylinder port 64, cavity 75 registers the intermediate exhaust port 71 with the final exhaust port 62, and as the slide valve 52 has caused cavity 91 to register brake cylinder port 53 with its intermediate exhaust port 71, pressure from the brake cylinder is then discharged to the atmosphere through passage 48, port 53, cavity 91, port 71, cavity 75, and thence out through the final exhaust port 62. The brakes in the rear are then quickly and full released and recharged, while those toward the front end of the train will be moved to the retarded release and restricted charging position as shown in Fig. 14, and described in retarded release and restricted charging. The period of time that the greater pressure in the reserve drum 96, holds the check valve 45 seated and chamber 46, closed to brake-pipe pressure in passage 49, aids the latter pressure to build up more rapidly throughout the entire train and thus facilitate a prompt release of the brakes.

It will again further be observed that the emergency piston 30 is held to its seat against bushing 4 by the heavy tension spring 35 and therefore has no space to move in to engage the latter, or in other words the piston 30 has no gap to jump across before it compresses the spring 35 in order to move and operate the slide valve 8. If however, in the service operations of the brakes upon the cars of a train, the emergency piston 30 and its slide valve 8 would from some cause stick and fail to respond to the service reduction of pressure being made in the brake pipe C and while causing a further reduction of the brake pipe pressure, the piston 30 and its slide valve 8 would then be forced by the preponderance of pressure in the chamber 3 to break loose from its stuck position. It then however, cannot make a sudden jump and cause the slide valve 8 to uncover the large emergency port 14, but will move outwardly to the left against the heavy cushion of the spring 35 until the slide valve 8 registers the equalizing or reducing port 13 with the port 14. The pressure in chamber 3 will then reduce through ports 13 and 14, passage 15, port 85 in cup piston 16, thence into the brake cylinder passage 48. The piston 30 and slide valve 8 are thus arrested in this position until the pressure of the equalizing drum 19 in chambers 3 and 17 reduce to slightly less than the resistance of the spring 35, then the latter aided by the brake pipe pressure will force piston 30 and slide valve 8 inwardly to the right until the piston 30 seats against the bushing 4 and uncover port 29. Slide valve 8 will blank the port 13 from port 14 and the parts are then again in their normal position, as shown in Fig. 11, and described in service and equalizing position. Also shown in Fig. 1 and described in normal position. The defective and undesired emergency quick action of the brakes upon the cars of a train is thus avoided as above stated and the parts are then again ready for the usual emergency application of the brakes.

What I claim, is,—

1. In air brake mechanism provided with a control valve consisting of a main service valve, an emergency valve co-operating and in combination therewith, a straight or direct air valve co-operating and in combination with said main service valve and said emergency valve, all substantially as set forth.

2. In air brake mechanism provided with a control valve consisting of a main service valve, a straight or direct air valve co-operating and in combination therewith, an emergency valve co-operating and in combination with said main service valve and said straight or direct air valve, yielding means for preventing undesired or defective quick action of said emergency valve during service and straight or direct air valve applications of the brakes.

3. In air brake mechanism provided with a control valve consisting of a main service valve, a straight or direct air valve, and an emergency valve; a drum in combination with said emergency valve, said emergency valve co-operating and in combination with said main service valve and said straight or direct air valve, means for charging said drum, means for reducing air pressure in said drum, means for preventing a backward flow of air pressure from said drum, and means for retaining a higher pressure in said drum than brake pipe pressure while making service applications of the brakes for a more efficient operation of the emergency application of the brakes.

4. In air brake mechanism provided with a control valve consisting of a main service valve, a straight or direct air valve co-operating and in combination therewith, an emergency valve co-operating and in combination with said main service valve and said straight or direct air valve, a brake pipe, an equalizing chamber for the said emergency valve provided with an intake port from said brake pipe and having an emergency port, said emergency valve having a reducing port in combination with said emergency port, means for charging said equalizing chamber and means for reducing the pressure in said equalizing chamber, means for preventing a backward flow of air pressure from said emergency equalizing chamber and means for retaining a higher air pressure in said emergency equalizing chamber than that of the brake pipe pressure while the brakes are set, for a more efficient operation of the emergency application of the brakes, means independent of the main service valve for making the emergency application, and means for making a quick release of the brakes.

5. An air brake mechanism provided with a main service valve and an emergency equalizing chamber and valve therefor, a drum in combination with said emergency valve, and equalizing chamber and said emergency valve co-operating and in combination with said main service valve means for charging said emergency equalizing chamber and drum, means for preventing a backward flow of air pressure from said emergency equalizing chamber and drum, means for reducing the air pressure in said emergency equalizing chamber and drum and means for retaining a higher pressure in said equalizing chamber and drum than that of the brake pipe during applications of the brakes, means for applying the brakes with service applications from both the main service valve and the emergency valve, and means for applying the brakes with the emergency valve independently of the main service valve and means for making a quick release of the brakes.

6. An air brake mechanism provided with a brake pipe, a main service valve and an emergency valve co-operating and in combination therewith, an equalizing chamber for said emergency valve provided with an intake port from the brake pipe and an emergency port, said emergency valve having a reducing port in combination with said emergency port, means for retaining a higher pressure in said equalizing chamber than that of the brake pipe pressure during applications of the brakes, means for reducing the air pressure in said emergency equalizing chamber and means for applying the brakes with service applications from both the main service valve and the emergency valve, means for making emergency applications with the emergency valve independently of the main service valve, and means for making a quick release of the brakes.

7. An air brake mechanism provided with a brake pipe, a main service valve, a straight or direct air valve co-operating and in combination therewith, an emergency valve co-operating and in combination with said main service valve and said straight or direct air valve, an equalizing chamber for said emergency valve provided with an intake port from the brake pipe and provided with an emergency port, and said emergency valve having a reducing port for reducing pressure in combination with said emergency port on a partial movement of the valve for a service application of the brakes and said emergency valve being adopted to supply pressure for operating the emergency application on a full movement of the emergency valve, means for applying the brakes with the straight or direct air valve in combination with the main service valve, and said emergency valve applications, means for holding the brake set, and means for compensating for brake cylinder leakage, and means for releasing the brakes.

8. In air brake mechanism provided with a control valve consisting of a main service valve, a straight or direct air valve, an emergency valve, said straight or direct air valve co-operating and in combination with said main service valve and said emergency valve co-operating and in combination with said main service valve and said straight or direct air valve, means for applying a service application of the brakes with a partial movement of the emergency valve for combining pressure from said emergency valve with the pressure from said main service valve application and means for applying the emergency application of the brakes with a full movement of said emergency valve independently of the said main service valve movements, means for applying and holding the brakes set with the said straight or direct air valve independently of the said main service valve and said emergency valve and means for compensating for brake cylinder leakage, means for making a quick release of the brakes.

9. In air brake mechanism provided with an emergency chamber and a drum, a control valve consisting of a main service valve a straight or direct air valve co-operating and in combination with said main service valve, an emergency valve and a piston therefor co-operating and in combination with said main service valve and said straight or direct air valve, means for holding the emergency valve seated in normal position and for holding the emergency port closed during a quick service application of the brakes to retain the normal pressure in the emergency chamber and drum for a more efficient operation of the emergency application, means for holding the brakes set with said main service valve and said straight or direct air valve, and means for releasing the brakes with said main service valve and said straight or direct air valve, and means for returning the emergency piston and valve to normal position ready for an available emergency application of the brakes.

10. In air brake mechanism provided with a control valve consisting of a main service valve and a straight or direct air valve, an emergency valve and an equalizing chamber therefor, said emergency valve and chamber co-operating and in combination with said main service valve, and said straight or direct air valve, an equalizing drum in combination with said emergency valve and equalizing chamber, means for reducing the emergency equalizing chamber and equalizing drum pressure into the brake cylinder with service and emergency applications of the brakes for a greater combined brake cylinder pressure, means for holding the brake application with the main service valve and the straight or direct air valve, and means for releasing the brakes.

11. In air brake mechanism provided with a brake pipe and brake cylinder, a control valve comprising a main service valve having a reserve drum and auxiliary reservoir attached thereto, a straight or direct air valve, an emergency valve having an emergency equalizing chamber and drum attached thereto, means for applying the brakes with quick service, service, full service, emergency or straight or direct air, the said quick service application pressure being supplied from the auxiliary reservoir and brake pipe to the brake cylinder, the said service pressure being supplied from the auxiliary reservoir and emergency equalizing chamber, the full service and straight or direct air pressure being supplied from the auxiliary reservoir, the emergency equalizing chamber and drum and brake pipe to the brake cylinder, the said combined emergency application pressure being supplied from the emergency equalizing chamber and drum, the auxiliary reservoir and the brake pipe to the brake cylinder, the pressure of the said reserve drum, and auxiliary reservoir being supplied from the brake pipe and the pressure of the said emergency equalizing drum being also supplied from the brake pipe, means for holding the brakes set with the said main service valve and means for holding the brake set with the said straight or direct air valve to compensate for any brake cylinder leakage, and means for making a quick release of the brakes.

12. In air brake mechanism provided with a control valve consisting of a main service valve, a straight or direct air valve co-operating and in combination therewith, and an emergency valve co-operating and in combination with said main service valve and said straight or direct air valve the said main service valve provided with a chamber and a service applying port, on auxiliary reservoir side, an auxiliary reservoir attached to the said main service valve chamber, said main service valve having a supplying and reducing service port on the brake pipe side and a reserve drum attached to said chamber on the inside or auxiliary reservoir side, a quick service chamber in combination therewith, said quick service chamber having a port and passage for supplying and holding the normal pressure in said quick service chamber and said reserve drum while the main service valve makes quick service, service, full service and emergency applications of the brakes for the purpose of assisting in the recharge of the auxiliary reservoir and aid the brake pipe pressure to build up more rapidly to make a quick release of the brakes, means for holding the brakes set with the straight or direct air valve and then compensate for any brake cylinder leakage, and means for making a quick release of the brakes.

13. In air brake mechanism provided with a control valve consisting of a main service valve having a piston connected thereto and exposed on one side to brake pipe pressure and on the other side to auxiliary reservoir pressure, a straight or direct air valve having a piston connected thereto and exposed on one side to brake pipe pressure and on the other side to the atmosphere and a spring constantly opposing said brake pipe pressure, an emergency equalizing chamber and drums, an emergency valve having a piston connected thereto and exposed on one side to brake pipe pressure and a constantly resisting spring co-operating with said brake pipe pressure and exposed on the other side to a chamber and drum pressure, means for automatically reducing any excess pressure in said chamber and drum to maintain an equal pressure with that of the brake pipe and spring pressure and means for returning the piston and valve to its normal position ready for an available emergency application of the brakes.

14. In air brake mechanism provided with a control valve consisting of a main service valve, a chamber for said service valve, said chamber having a service port and a release port, a piston for said main service valve, exposed on one side to brake pipe pressure and on the other side to auxiliary reservoir pressure, a straight or direct air valve, a chamber for said straight or direct air valve, said chamber having an application port and a release port, a piston for said straight or direct air valve, said valve having an application port and a grooved release port, said piston exposed on the inside to brake pipe pressure and on the outside to the atmosphere and a spring constantly opposing said brake pipe pressure, an emergency valve having a chamber and a drum attached thereto, a large emergency port therein, a valve in said chamber provided with a reducing port, a piston for said emergency valve, exposed on one side to brake pipe pressure and a constantly resisting spring co-operating with said brake pipe air pressure and exposed on the other side to said chamber and said drum pressure, a cap provided with a service port for restricting the flow of brake pipe air pressure to and from the piston of said main service valve, means for preventing undesired or defective quick action of said main service piston and valve, and means for preventing undesired or defective quick action of said emergency piston and valve.

15. In air brake mechanism provided with a control valve consisting of a main service valve having a chamber and a reserve drum attached thereto, an emergency valve having an emergency equalizing chamber and drum attached thereto, a straight or direct air valve, said main service valve comprising a slide and a seat therefor, said seat having a port for the passage of pressure to and from said reserve drum, and said slide having a full release port and a retarded release restricted port, a full release charging port and a retarded release restricted charging port, and groove extensions from said full release charging port, and said retarded release restricted charging port adopting said full release charging port to register with said reserve drum charging port and at the same time with a quick service charging port, and on further movement of said slide adopting said retarded release restricted charging port to register with said reserve drum port and a quick service charging port, means for applying the brakes with said main service valve when the pressure is above the resistance of said straight or direct air valve, means for applying the brakes with said straight or direct air valve to hold the brakes set and to compensate for any brake cylinder leakage, means for making a quick release of the brakes.

16. An air brake mechanism provided with a main service valve having an auxiliary reservoir chamber and a reserve drum attached thereto, an emergency valve co-operating and in combination with said main service valve, said emergency valve having a chamber and an equalizing drum attached thereto, said main service valve comprising a slide and a seat therefor, said seat having a port for the passage of air pressure to and from said reserve drum and said slide having a full release port and a retarded release restricted port, a full release charging port and a retarded release restricted charging port and groove extensions from said full release charging port and said retarded release restricted charging port, adopting said full release charging port to register with said reserve drum charging port, and at the same time with a quick service charging port, and on further movement of said slide adopting said retarded release restricted charging port to register with said reserve drum port and a quick service charging port, means for applying the service applications with said main service valve, means for applying the emergency application while the main service valve has the brakes set with a service application for a greater brake cylinder pressure and means for making a quick release of the brakes.

17. In air brake mechanism provided with a control valve consisting of a main service valve, a straight or direct air valve co-operating and in combination therewith, an emergency valve co-operating and in combination with said main service valve and said straight or direct air valve, means for preventing undesired or defective quick action of said main service valve during service and straight or direct air applications of the brakes, and means for preventing undesired or defective quick action of said emergency valve during service and straight or direct air applications of the brakes.

18. An air brake mechanism provided with a main service valve, an emergency valve, said emergency valve having a chamber and a drum co-operating therewith, said main service valve being provided with a chamber and an auxiliary reservoir and a reserve drum, the normal pressure of said reserve drum being retained while said main service valve makes quick service, service, full service, and emergency applications of the brakes and the release of said reserve drum pressure in release positions of the main service valve for recharging said auxiliary reservoir and holding the brake pipe quick service charging port closed until said reserve drum pressure becomes less than brake pipe pressure, means for making a quick release of the brakes and means for charging said emergency drum, said auxiliary reservoir and said reserve drum and means for preventing undesired or defective quick action of the brakes.

19. In air brake mechanism provided with a control valve consisting of a main service valve; an emergency valve and a drum co-operating therewith, a straight or direct air valve co-operating and in combination with said main service valve and said emergency valve, said main service valve being provided with an auxiliary reservoir and a reserve drum, the normal pressure of said reserve drum being retained while said main service valve makes quick service, service, full service and emergency applications of the brakes and the release of said reserve drum pressure in release positions of the main service valve for recharging said auxiliary reservoir and holding the brake pipe quick service charging port closed until said reserve drum pressure becomes less than brake pipe pressure, means for charging said emergency drum, said auxiliary reservoir and said reserve drum, and means for preventing undesired or defective quick action of the brakes.

20. An air brake mechanism having a main service valve, an emergency valve, a straight or direct air valve, and means for preventing undesired quick action of the brakes.

21. In air brake mechanism provided with a control valve consisting of a main service slide valve chamber and reserve drum attached thereto, a main slide valve in said chamber, a graduating slide valve superposed on said main slide valve, a main actuating piston connected thereto, and exposed on one side to brake pipe pressure and on the other side to auxiliary reservoir pressure, an emergency valve cooperating and in combination therewith, said emergency valve having a slide valve chamber and a drum attached thereto, a supply port with a check valve therein, and an emergency port, a slide valve in said chamber and an actuating piston connected thereto, and exposed on one side to brake pipe pressure and a spring co-operating therewith, and on the other side to the pressure in said chamber and drum, said slide valve having a reducing port and arranged to control said supply port and said emergency port, a brake cylinder vent valve and a piston therefor, a combination brake pipe and brake cylinder check valve combined with said brake cylinder vent valve, and a spring interposed therebetween, a straight or direct air valve cooperating and in combination therewith, said straight or direct air valve having a slide valve chamber and a slide valve therein, an actuating piston connected thereto, and exposed on one side to brake pipe pressure and on the other side to the atmosphere and a spring opposing brake pipe pressure, and means for retaining the normal pressure in said reserve drum during service and emergency applications for aiding a prompt and quick release of the brakes.

In testimony whereof, I set my hand, this 11th day of March, 1929.

ALVA L. GOODKNIGHT.